(12) United States Patent
Cross et al.

(10) Patent No.: US 7,534,056 B2
(45) Date of Patent: May 19, 2009

(54) TRAIL CAMERA

(75) Inventors: Bill Cross, Overland Park, KS (US); Darin Stephens, Independence, MO (US)

(73) Assignee: Bushnell Inc., Overland Park, KS (US)

(\*) Notice: Subject to any disclaimer, the term of this patent is extended or adjusted under 35 U.S.C. 154(b) by 512 days.

(21) Appl. No.: 11/184,204

(22) Filed: Jul. 19, 2005

(65) Prior Publication Data
US 2007/0019941 A1    Jan. 25, 2007

(51) Int. Cl.
*G03B 17/00* (2006.01)
(52) U.S. Cl. ............... 396/427; 396/433; 348/143; 348/152; 348/373; 348/375; 70/2
(58) Field of Classification Search .......... 396/5, 396/427, 433; 348/143, 372, 373, 375, 152, 348/72; 70/2
See application file for complete search history.

(56) References Cited

U.S. PATENT DOCUMENTS

| | | | | |
|---|---|---|---|---|
| 4,866,285 A | * | 9/1989 | Simms | 250/495.1 |
| 4,913,391 A | | 4/1990 | Klipp | |
| 5,121,268 A | * | 6/1992 | Nakayama et al. | 360/71 |
| 5,351,923 A | | 10/1994 | Booth, Jr. | |
| 5,649,257 A | * | 7/1997 | Kempka | 396/428 |
| 5,664,750 A | | 9/1997 | Cohen | |
| 5,723,808 A | | 3/1998 | Devall | |
| 5,917,545 A | * | 6/1999 | Kowno et al. | 348/231.9 |
| 5,934,113 A | * | 8/1999 | Loughlin | 70/50 |
| 6,021,984 A | | 2/2000 | Mills | |
| 6,349,905 B1 | * | 2/2002 | Mills | 248/126 |
| 6,449,431 B1 | * | 9/2002 | Cuddeback et al. | 396/27 |
| 6,715,939 B2 | * | 4/2004 | Ford | 396/427 |
| 6,806,681 B1 | * | 10/2004 | Cheiky et al. | 320/107 |
| 6,837,629 B1 | * | 1/2005 | Schulze et al. | 396/427 |

FOREIGN PATENT DOCUMENTS

JP    11-064968    3/1999

OTHER PUBLICATIONS http://web.archive.org/web/20020624043546/http://www.pimall.com/NAIS/cybereye.html Jun. 2002.*
http://web.archive.org/web/*/http://www.pimall.com/NAIS/cybereye.html.*

\* cited by examiner

*Primary Examiner*—W. B. Perkey
*Assistant Examiner*—Michael A Strieb
(74) *Attorney, Agent, or Firm*—Hovey Williams LLP

(57) ABSTRACT

A trail camera having one or more hinges to provide pivoting of the trail camera after mounting to a fixed object is disclosed. The hinges allow pivoting of a housing and/or a camera section after the trail camera is mounted to enable a user to direct the trail camera towards a target location to capture an image regardless of the particular mounting orientation of the camera. Such a configuration enables the trail camera to be mounted at a vertical elevation above the target location while still recording events in proximity to the target location.

30 Claims, 4 Drawing Sheets

TRAIL CAMERA

BACKGROUND OF THE INVENTION

1. Field of the Invention

The present invention relates to trail cameras. More particularly, the invention relates to a trail camera for mounting to a fixed object and having one or more hinges to enable pivoting of the trail camera relative to the object.

2. Description of the Related Art

Trail cameras are often used to automatically capture images at a remote location by utilizing a sensor to trigger a camera device. For example, trail cameras are commonly utilized by hunters to record game activity, such as the passing of a deer, at a remote hunting location. After installation, a hunter periodically access the trail camera to determine the existence and nature of any game activity.

Unfortunately, due to theft and environmental conditions, trail cameras must be secured to a fixed object, such as a tree, through the use of screws, bolts, and other similar fixed securing devices. While such securing devices may sometimes deter theft and withstand environmental conditions, they limit the maneuverability of the trail cameras such that the cameras may not be maneuvered or otherwise positioned after installation. This limitation additionally requires trail cameras to be placed in close vertical proximity to the desired recording location.

For instance, if a hunter desires to record the passing of game at a particular trail spot, the hunter must mount a trail camera at the vertical level of the game, such as three to six feet above the ground in proximity to the trail spot. Such positioning of trail cameras in proximity to game and the ground increases the probability that the trail cameras will be detected by vandals who may attempt to steal, destroy, or access the prominently displayed trail cameras. Furthermore, the positioning of trail cameras in vertical proximity to the game increases the probability that game, or other recording subjects, will detect the presence of the cameras and undesirably alter their behavior.

SUMMARY OF THE INVENTION

The present invention solves the above-described problems and provides a distinct advance in the art of trail cameras. More particularly, the invention provides a trail camera having one or more hinges to enable pivoting of the trail camera after mounting to a fixed object. Such functionality enables the trail camera to be mounted at an elevated position while still enabling the camera to capture images near the ground.

In one embodiment, the present invention concerns a trail camera for mounting to a fixed object. The trail camera generally includes a housing operable to be coupled to the fixed object, a camera section coupled with the housing, and a hinge coupled with the housing. The hinge is operable to pivot at least a portion of the trail camera relative to the fixed object.

In another embodiment, the trail camera includes a housing, a camera section coupled with the housing and a hinge including a first section integral with at least a portion of the housing, a second section operable to be secured to the object, and a pivotable joint coupled between the first section and the second section to enable pivoting of the housing after the hinge is secured to the object. The camera section comprises a camera unit operable to record an image and a sensor operable to trigger the camera unit.

In another embodiment, the trail camera includes a substantially waterproof housing having a front and a rear and a camera section coupled with the front of the housing. The camera section comprises a camera unit operable to record an image, a motion sensor operable to trigger the camera unit, and a camera section hinge coupled between the camera section and the housing to enable pivoting of the camera section about the housing.

The trail camera further includes a hinge having a first section integral with at least a portion of the rear of the housing, a second section having an aperture and a cable lock to secure the second section to the object, and a first pivotable joint coupled between the first section and the second section to enable pivoting of the housing after the second section is secured to the object.

The hinge also preferably includes a third section and a second pivotable joint coupled between the second section and the third section such that the third section may pivot over at least a portion of the aperture and the cable lock to prevent removal of the hinge from the object.

Other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein.

Figure 1:
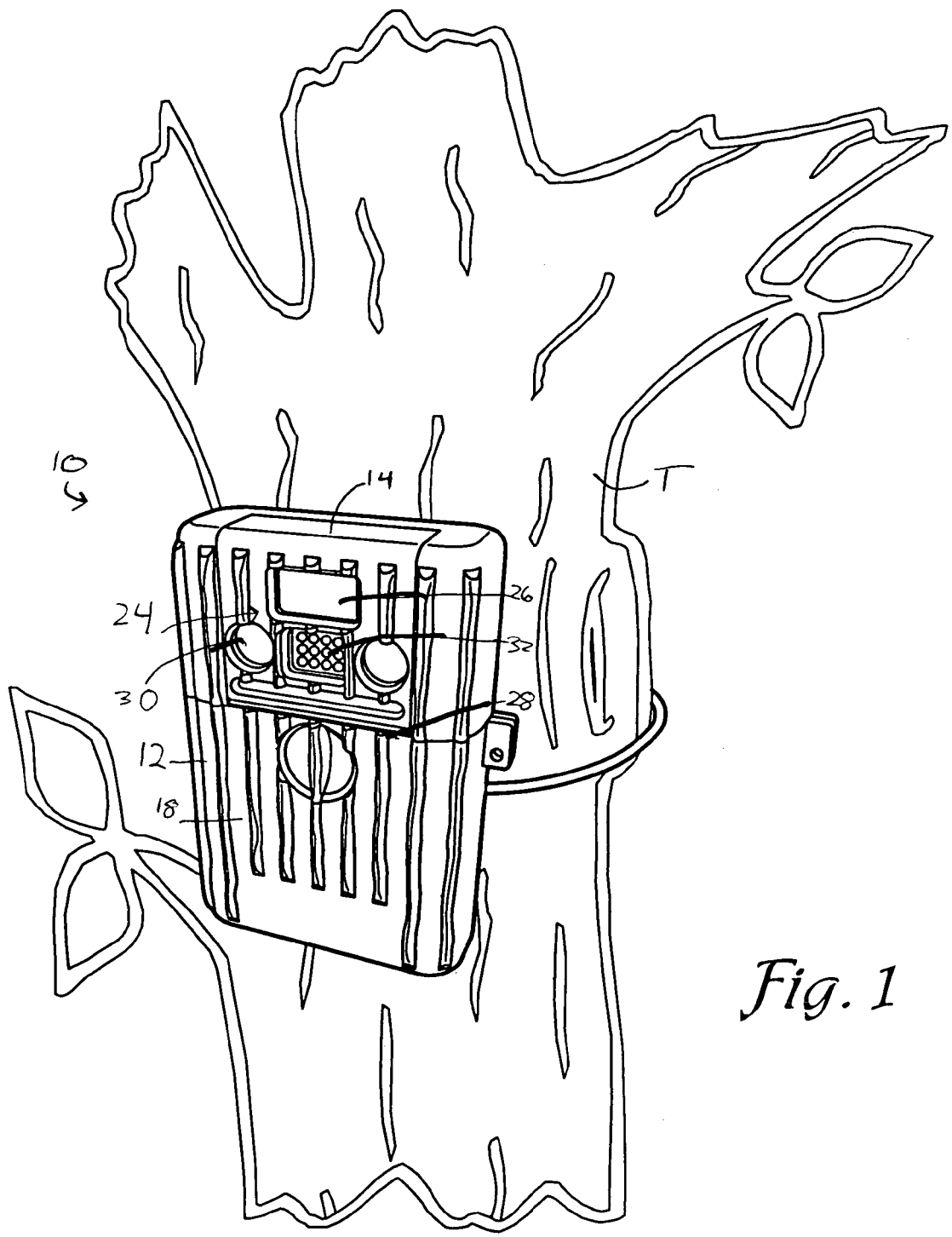
FIG. 1 is a perspective view of a trail camera configured in accordance with various embodiments of the present invention, the trail camera shown mounted to a tree.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

Reference will now be made in detail to various preferred embodiments of the present invention, examples of which are illustrated in the accompanying drawings. Wherever possible, the same reference numbers are used throughout the drawings to refer to the same or like parts.

Referring to FIGS. 1-6, a trail camera 10 is shown constructed in accordance with various preferred embodiments of the present invention. As is described below in more detail, the trail camera 10 is operable to be mounted to a fixed object, such as a tree T, pole, wall, a natural or man-made formation, etc, to automatically or selectively record an image. Preferably, the trail camera 10 is operable to mount to an elevated position on the tree T.

The trail camera 10 broadly includes a housing 12, a camera section 14 coupled with the housing 12, and a first hinge 16 coupled with the housing 12 and operable to pivot at least a portion of the trail camera 10 after the housing 12 is secured to the tree T.

Figure 2:
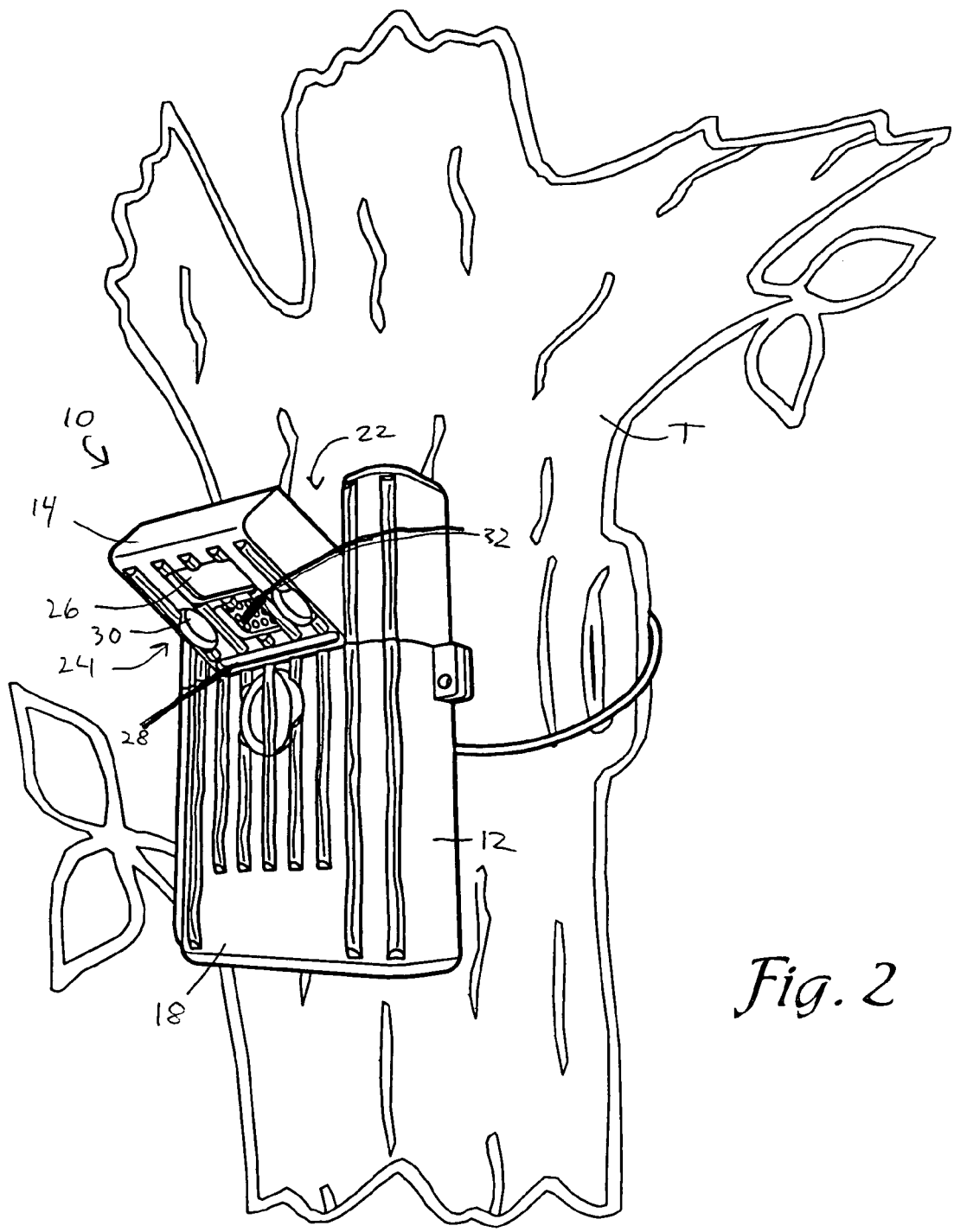
FIG. 2 is a perspective view of the trail camera of FIG. 1 including a pivoting camera section.
Figure 3:
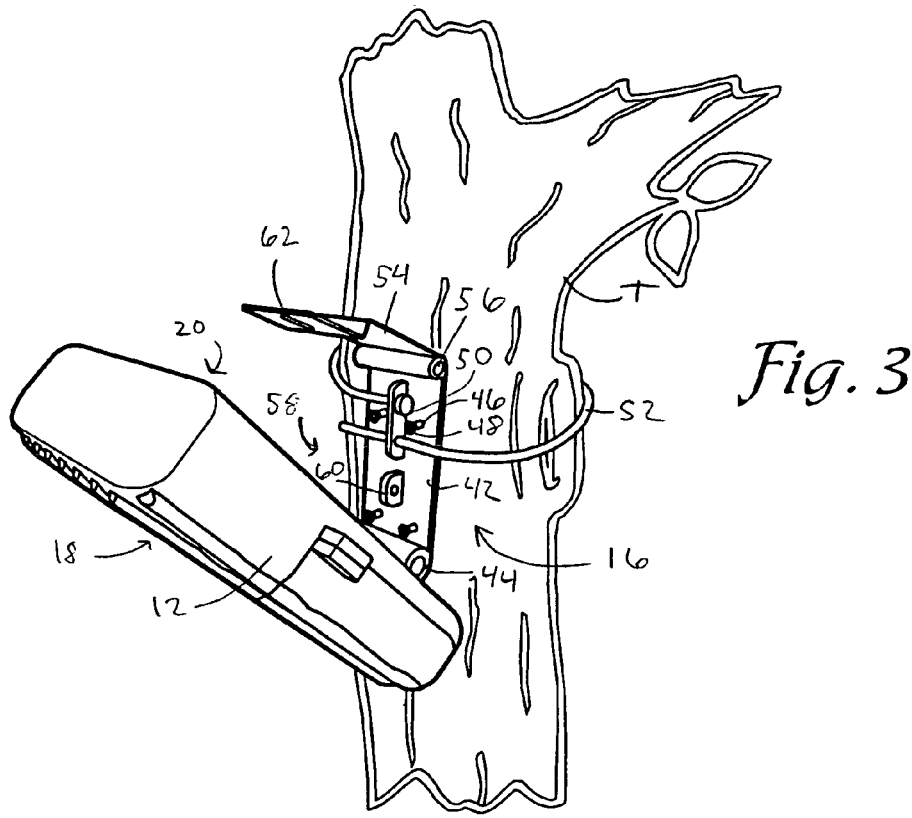
FIG. 3 is a perspective view of the trail camera of FIGS. 1-2 including a hinge for mounting to the tree.
Figure 4:
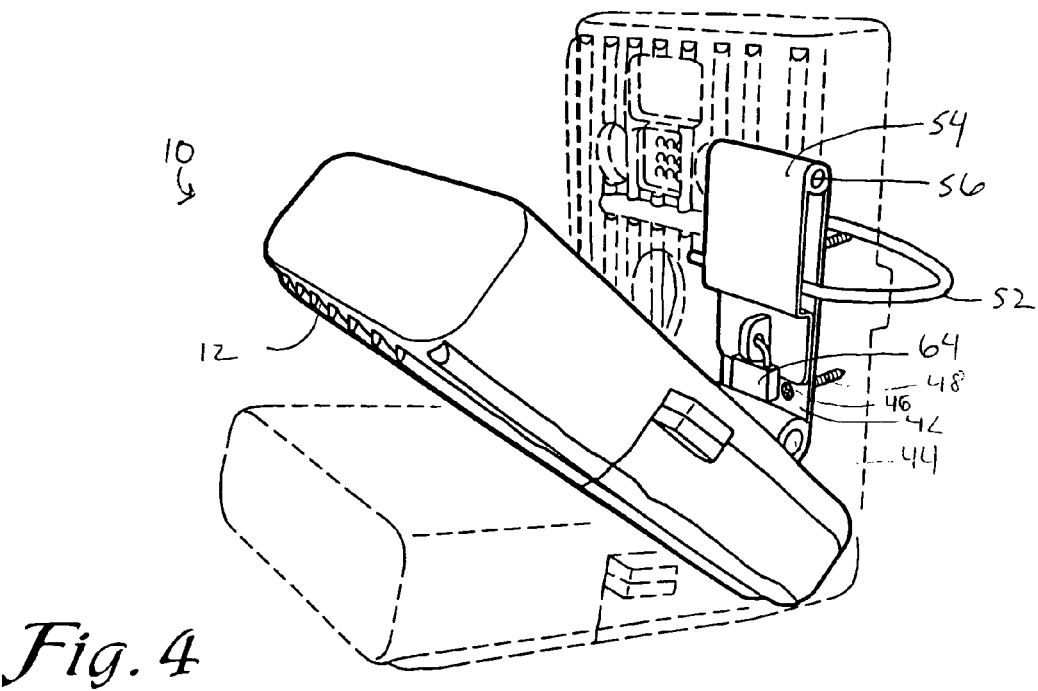
FIG. 4 is a perspective view of the trail camera of FIGS. 1-3 showing the trail camera in various stages of pivoting about the hinge.
Figure 5:
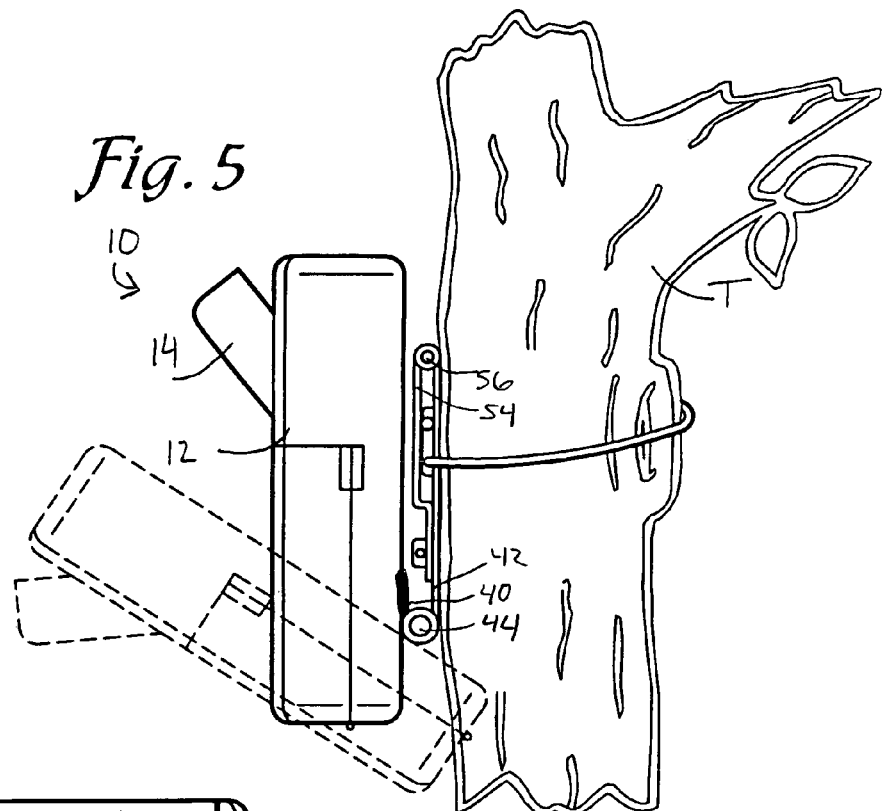
FIG. 5 is a side view of the trail camera of FIGS. 1-4 showing the trail camera and camera section in various stages of pivoting.
Figure 6:
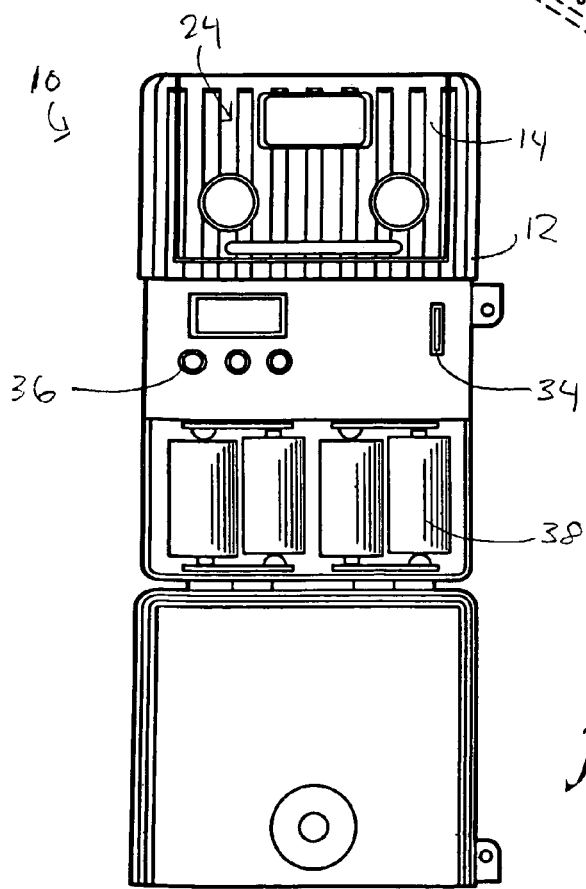
FIG. 6 is a front view of the trail camera of FIGS. 1-5 showing an open housing.

The housing 12 includes a front portion 18 and a rear portion 20. The front portion preferable includes a slot 22 for reception of the camera section 14. The slot 22 may be of any size or configuration to correspond to the size or configuration of the camera section 14. Preferably, the slot 22 is positioned in proximity to the top of the front portion 18 of the housing 12, as shown in FIGS. 1-2. Additionally, the housing 12 may open or otherwise expand to enable access of various housed elements, as shown in FIG. 6 and described below.

The housing 12 is preferably substantially waterproof and otherwise weather resistant to enable the trail camera 10 to be positioned outdoors in inclement conditions for extended periods of time. Additionally, the housing 12 is preferably generally tamper resistant and durable such that unauthorized entities, including thieves, vandals, and animals, may not easily breach the housing 12 to destroy the trail camera 10, remove its components such as the camera section 14, or otherwise access the trail camera 10. Thus, the housing 12 is preferably formed from ABS or other substantially rigid material, including metal and other plastics.

Additionally, the housing 12, including the front portion 18 and rear portion 20, may be shaped to conform to anticipated environmental conditions. For example, the front portion 18 and rear portion 20 may be generally curved to enable the housing 12 to conform to the shape of the tree T. Additionally, the housing 12 may be camouflaged or otherwise disguised to conceal the existence of the trail camera 10. For example, the housing 12 may include a plurality of protruding humps or lines to emulate the bark of the tree T as shown in FIGS. 1-2. Such additional concealment may be desirable in various embodiments to further protect the trail camera 10 from undesirable access.

The camera section 14 is coupled with the housing 12 to enable the trail camera 10 to record an image. Preferably, the camera section 14 is coupled with the front portion 18 of the housing 12 and positioned to be at least partially pivotable within the slot 22. However, the camera section 14 may be coupled with other portions of the housing 12, such as the sides, top, bottom, or rear of the housing 12.

The camera section 14 preferably includes a camera unit 24 operable to record an image, a sensor 26 operable to trigger the camera unit 24, and a camera section hinge 28 operable to couple the camera section 14 to the housing 12. As described below, the camera unit 24, sensor 26, and camera section hinge 28 may be at least partially integral within a common housing, or the various elements of the camera section 14 may be discrete such that some elements are positioned within a common housing and other elements are positioned within the housing 12 or elsewhere in association with the trail camera 10.

The camera unit 24 preferably includes various conventional camera elements such as a lens 30 and a flash 32. The lens 30 is operable to focus or otherwise direct an image to be stored on a recording medium 34. In embodiments where the camera unit 24 comprises a conventional film camera or film video recorder, the recording medium 34 is preferably film. In embodiments where the camera unit 24 is a digital device, the recording medium 34 may be a digital storage medium such as RAM, ROM, flash memory, a hard disk, a floppy disk, magnetic or optical storage mediums, other conventional digital mediums, and combinations thereof.

The flash 32 may include conventional flash elements, such as electronically triggered illumination elements in a bulb and/or LED configuration. Additionally, the flash 32 may comprise infrared LED elements to facilitate camera unit 24 functionality by enabling focusing, framing, and image capture in general darkness without illuminating a target location with visible light. Such a configuration may also facilitate night vision capabilities of the camera unit 24.

The recording medium 34, and other related elements, such as a control unit 36, and a power source 38, may be housed within the camera section 14 or elsewhere within or associated with the housing 12. Preferably, the recording medium 34, control unit 36, and power source 38 are housed separately from the camera section 14 within the housing 12, as shown in FIG. 7, to enable the camera section 14 to be compactly configured for pivoting within the slot 22. Such a configuration additionally enables the housing 12 to be opened or expanded to enable access to the recording medium 34, control unit 36, power source 38, and other housed elements.

The control unit 36 controls the functionality of the camera section 14 and may include a plurality of inputs and a display to provide feedback. For example, the control unit 36 may include circuitry or programs to determine when to record an image with the camera unit 24 after triggering by the sensor 26 or various other related functions, such as the method of storing images or additional criteria for determining when to record an image. The power source 38 may be any electric power source such as batteries, a battery pack, or a receptacle for receiving power from an external source, such as a power line.

The camera unit 24 may be operable to record still images and/or video upon activation. Furthermore, the camera unit 24 may include night vision components to enable the camera unit 24 to record images and/or video in general darkness.

The sensor 26, lens 30, and flash 32 are preferably integral within the camera unit 24 such that they may be simultaneously directed at a desired target location to facilitate image and video recording. However, the lens 30 and/or flash 32 may be housed within the housing 12 to facilitate access and storage. Thus, in some embodiments, only the lens 30 or flash 32 may be positioned on or within the camera unit 24. Furthermore, the recording medium 34 may be positioned remotely from the trail camera 10, such as on a remote computing system connected to the Internet, to enable the trail camera 10 to communicate, wired or wirelessly, with the recording medium 34.

The camera unit 24 may additionally include, or be coupled with, an accessing device to facilitate access of recorded images. For example, in some embodiments it may be desirable to enable the recording medium 34 to be removed from the housing 12 enable easy access recorded images. However, in other embodiments, in may be desirable to additionally or alternatively allow the recording medium 34 to be accessed, through wireless or wired communication methods, without the need to open or physically access the housing 12. Such a configuration may be desirable as it enables access of recorded images without requiring the trail camera 10 to be physically accessed at an elevated or other precarious position.

The sensor 26 is coupled with the camera unit 24 and is operable to detect an event and trigger the camera unit 24 to record the event or related activity. The sensor 26 is preferably positioned in the same direction as the lens 30 to ensure that recorded images include the triggering event. For example, the sensor 26 is preferably positioned in agreement with the lens 30 such that game that triggers the sensor 26 will be captured by the lens 30 in the associated recorded image. Thus, the sensor 26 is preferably integral with the camera section 14 in proximity to the camera unit 24, however the sensor 26 may be positioned on the front portion 18 of the housing 12 or elsewhere on or within the trail camera 10.

The sensor 26 may be operable to detect heat, light, motion, sound, vibration, the passage of time, etc, or any combination thereof to trigger the camera unit 24. Preferably, the sensor 26 includes a passive infrared motion detector operable to detect movement of an animal or human. Such functionality may be desirable to detect the passage of various game in proximity to the trail camera 10.

The camera section hinge 28 is coupled between the camera section 14 and the housing 12 to enable pivoting of the camera section 14 about the housing 12. Preferably, the camera section hinge 28 is positioned within or adjacent the slot 22 to enable the camera section 14 to be pivoted at least partially into and out of the slot 22 if desired.

Preferably, the camera section hinge 28 enables the camera section 14 to pivot at least 45 degrees from the housing 12 as shown in FIG. 2. Such a range of motion is generally preferable as it enables the trail camera 10 to be secured in innumerable configurations and orientations while allowing the camera section 14 to be directed at a specific target location, such as a location is proximity to the ground. For example, such a pivoting configuration enables the camera section 14 to capture images at any angle between the base of the tree out to perpendicular to the tree. However, the camera section hinge 28 may enable fewer or greater degrees of movement depending upon the requirements of the particular embodiment.

The housing 12 is coupled to the tree T by the first hinge 16. Broadly, the first hinge 16 is operable to be securely coupled to the tree T, through the use of removable or fixed fasteners, such that the first hinge 16 may pivot at least a portion of the housing 12 after the first hinge 16, and the coupled housing 12, is secured to the tree T. As is described below, such a configuration enables the trail camera 10 be positioned at an elevated and discrete vertical location on the tree T while enabling the front portion 18 of the housing 12, and/or the camera section 14, to be oriented towards a target location in proximity to the ground. Such a configuration enables the trail camera 10 to capture images at any angle between the base of the tree T out to perpendicular to the tree T.

Preferably, the first hinge 16 includes a first section 40 operable to couple with the housing 12, a second section 42 operable to be securely coupled to the tree T, and a first pivotable joint 44 coupled between the first section 40 and the section 42 to enable pivoting of the housing 12 after the first hinge 16 is secured to the tree T.

The first section 40 is preferably operable to couple with the rear portion 20 of the housing 12 to enable the front portion 18, and associated camera section 14, to be orientated away from the tree T and towards a target location. However, the first section 40 may be coupled with any portion of the housing 12 to enable the trail camera 10 be positioned in any desired orientation. The first section 40 may be removably or permanently coupled with the housing 12 through conventional fasteners, such as screws, nails, bolts, cables, latches, etc.

Preferably, the first section 40 is integral with the rear portion 20 of the housing 12, such as by being formed as part of the rear portion 20 or otherwise permanently included or enclosed within the rear portion 20, to provide stability to the mounted trail camera 10 and prohibit the housing 12 and camera section 14 from being removed from the first hinge 16 by mischievous third parties or adverse environmental conditions.

The second section 42 is operable to be securely coupled to the tree T through the use of removable or fixed fasteners. Preferably, the second section 42 includes at least one aperture 46 to enable a mounting element 48, such as a bolt, screw, nail, etc, to pass through the second section 42 to securely couple the first hinge 16 to the tree T. In various embodiments, the second section 42 includes four apertures 46 positioned at spaced intervals along the second section 42 to provide additional coupling strength and to prevent the first hinge 16 from being pulled apart from the tree T.

The second section 42 also preferably includes a cable lock 50 to further secure the second section 42 to the tree T. The cable lock 50 is operable to securely receive a cable 52, such as a conventional security cable comprised of durable or resilient material, that has been positioned around or though the tree T. The cable lock 50 generally prevents the cable 52 from being pulled or otherwise detached from the first hinge 16, thereby further securing the first hinge 16, and housing 12, to the tree T. The cable lock 50 may include latches, locking elements, and other similar structures to ensure that the cable 52 may be removed from the cable lock 50 only by authorized individuals.

The first pivotable joint 44 couples the first section 40 and second section 42 to enable pivoting of the housing 12 after the second section 42 is secured to the tree through the use of the mounting element 48, cable 52, or other such devices. The first pivotable joint 44 is preferably a durable smooth-motion hinge to enable the housing 12 to be easily positioned in a desired configuration and to also enable the housing 12 to retain the desired configuration after initial positioning and during exposer to potentially adverse environmental conditions.

The first hinge 16 also preferably includes a third section 54 and a second pivotable joint 56. The second pivotable joint 56 is coupled between the second section 42 and the third section 54 to enable the third section 54 to pivot over at least a portion of the second section 42 to restrict access to the second section 42.

The third section 54 may have a width substantially equal to the width of the second section 42, and a length less than the length of the second section 42, to enable the third section 54 to restrict access to at least a portion of the second section 42. Preferably, the third section 54 is configured, such as by having a particular length and width, to pivot over at least a portion of the aperture 46 and cable lock 50 to prevent or restrict removal of the mounting element 48 and/or cable 52.

To further restrict access to the second section 42 and further prevent removal of the first hinge 16 and housing 12 from the tree T, the first hinge 16 preferably includes a security device 58 to secure the third section 54 to the second section 42 when the third section 54 is pivoted over at least a portion of the second section 42. The security device 58 may include locks, latches, clamps, bolts, etc. Preferably, the security device 58 includes a looping element 60 integral with the second section 42 and a slot 62 integral with the third section 54 such that the looping element 60 may be received within the slot 62 when the third section 54 is fully pivoted over the second section 42. A lock 64, such as a keyed or combination lock, may be inserted through the looping element 60 to prevent removal of the third section 54 from the second section 42 and thus removal of the first hinge 16 from the tree T.

In operation, a user, such as a hunter, locates a desired fixed mounting location for the trail camera 10. The trail camera 10 may be mounted in elevated and discrete locations to prevent theft by third parties and detection by animals, as is described above.

To mount the trail camera 10 to the tree T, the user preferably aligns the first hinge 16 with the tree T by placing the second section 42 adjacent to the tree T. The mounting elements 48 are then forced through the apertures 46 to secure the first hinge 16 to the tree. For example, the user may drive a screw through the apertures 46 and into the tree. For additional support and/or security, the user may secure the cable 52 to the tree T by looping the cable 52 around or through the tree T, and then securing the cable 52 to the cable lock 50.

In embodiments having the third section 54, the user may pivot the third section 54 over the second section 42 to block access to at least a portion of the apertures 46 and cable lock 50. Furthermore, the user may secure the third section 54 to the second section 42 by positioning the looping element 60 within the slot 62 and then locking the looping element 60 with the lock 64.

Such a configuration enables the user to easily and quickly secure the trail camera 10 to the tree T through the use of the mounting elements 48 and cable 52, while making it difficult for third parties, inclement environmental conditions, and animals, to remove the trail camera 10 from the tree T due to the protection provided by the third section 54 and security device 58.

After mounting the trail camera 10 to the tree T, the user may position the trail camera 10 to ensure that a desired location is monitored, regardless of the initial orientation of the mounted trail camera 10. For example, the user may pivot the housing 12, even after mounting of the trail camera 10 to the tree T, about the first hinge 16 to face the housing 12, and associated camera section 14, in a particular direction to monitor the desired location. Specifically, the user may position the trail camera 10 to capture images at any angle between the base of the tree T out to perpendicular to the tree T. Thus, in situations where the trail camera 10 is mounted many feet above the ground, the housing 12 may be pivoted to face downward such that the lens 30 may capture an image near the ground even though the trail camera 10 is discretely positioned above.

Additionally or alternatively, the user may position the camera section 14 in a desired orientation even after mounting of the trail camera 10 to the tree T. For example, the user may pivot the camera section 14 away from the slot 22 and about the housing 12 due to the camera section hinge 28 to face the camera section 14 in a particular direction towards the desired target location. Specifically, the user may position the camera section 14, alternatively or in addition to the housing 12, to capture images at any angle between the base of the tree T out to perpendicular to the tree T. Thus, in situations where the trail camera 10 is mounted many feet above the ground, or in situations where the trail camera 10 lacks the first hinge 16 or is unable to pivot above the first hinge 16, the camera section 14 may be pivoted downward such that the lens 30 may capture an image near the ground. Similarly, the housing 12 may be pivoted about the first hinge 16 and the camera section 14 may simultaneously be pivoted about the camera section hinge 28 to provide further control to the user in orientating and positioning the trail camera 10.

After positioning, the user may utilize the control unit 36 to control the functionality of the trail camera 10, such as by configuring the camera section 14 to record images under certain conditions. Preferably, the trail camera 10 generally captures images when the camera unit 24 is triggered by the sensor 26. For example, if game, such as a deer, walks through the desired location, the sensor 26 may be triggered to record a still or video image of the deer for future reference by the user. The user may later reposition the trail camera 10 after mounting through pivoting about the first hinge 16 and/or camera section hinge 28.

To unmount the trail camera 10 from the tree T, the user disables the security device 58, such as by unlocking the lock 64, pivots the third section 54 away from the second section 42, removes the cable 52 from the cable lock 50, and removes the mounting elements 48 from the tree T through the apertures 46. The trail camera 10 may then be repositioned at another location by the user.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

The invention claimed is:

1. A trail camera for mounting to a fixed object, the trail camera including:
   a housing operable to be coupled to the fixed object, the housing including a slot positioned on a front side thereof;
   a camera section comprising—
      a camera unit operable to record an image and to be received within the slot, and
      a sensor, integral with the camera section in proximity to the camera unit, operable to trigger the camera unit; and
   a hinge coupled with the housing and the camera section, the hinge being operable to pivot the camera section relative to the housing after the housing is secured to the fixed object, such that the camera section is operable to be at least partially pivoted within the slot.

2. The trail camera of claim 1, wherein the housing is coupled to the fixed object utilizing a second hinge.

3. The trail camera of claim 2, wherein the second hinge includes a security device to prevent removal of the housing from the fixed object.

4. The trail camera of claim 1, wherein the housing includes a power source to power the camera section and a recording medium to store recorded images.

5. The trail camera of claim 1, further including a flash.

6. The trail camera of claim 5, wherein the flash includes a light bulb.

7. The trail camera of claim 5, wherein the flash includes infrared LED elements to enable image capture in general darkness without illuminating a target location with visible light.

8. The trail camera of claim 1, wherein the sensor is positioned on the front portion of the housing and in the same direction as a lens of the camera unit.

9. The trail camera of claim 1, wherein the sensor is operable to detect occurrences selected from the group consisting of heat, light, motion, sound, vibration, and the passage of time.

10. The trail camera of claim 1, wherein the sensor includes a passive infrared motion detector operable to detect movement of an animal or human.

11. The trail camera of claim 1, wherein the housing includes a plurality of protrusions that emulate the bark of a tree.

12. A trail camera for mounting to a tree, the trail camera including:
   a housing including a slot positioned on a front side thereof;

a camera section coupled with the housing, the camera section comprising—
  a camera unit operable to record an image and to be received within the slot, and
  a sensor, integral with the camera section in proximity to the camera unit, operable to trigger the camera unit;
a first hinge coupled with the housing and the camera section, the first hinge being operable to pivot the camera section relative to the housing after the housing is secured to the fixed object, such that the camera section is operable to be at least partially pivoted within the slot; and
a second hinge including a first section integral with at least a portion of the housing, a second section operable to be secured to the tree, and a pivotable joint coupled between the first section and the second section to enable pivoting of the housing after the second hinge is secured to the tree.

13. The trail camera of claim 12, wherein the second section includes an aperture to enable a mounting element to pass through the second section to secure the hinge to the tree.

14. The trail camera of claim 13, the hinge further including a third section and a second pivotable joint, the second joint being coupled between the second section and the third section such that the third section is operable to pivot over at least a portion of an aperture to prevent removal of the hinge from the tree.

15. The trail camera of claim 14, wherein the hinge includes a security device to secure the third section to the second section.

16. The trail camera of claim 12, wherein the second section includes a cable lock to securely receive a cable to prevent removal of the hinge from the tree.

17. The trail camera of claim 12, wherein the camera section includes a camera section hinge operable to pivotably couple the camera section to the housing such that both the camera section and the housing are operable to be pivoted after the hinge is secured to the tree.

18. The trail camera of claim 12, wherein the sensor detects motion to trigger the camera unit to record the image.

19. The trail camera of claim 12, wherein the camera unit is a digital camera unit.

20. The trail camera of claim 12, wherein the camera unit is operable to record still images and video.

21. The trail camera of claim 12, wherein the housing includes a power source to power the camera section and a recording medium to store recorded images.

22. A trail camera for mounting to a tree, the trail camera including:
a substantially waterproof housing having a front, a rear and a slot positioned on the front;
a camera section coupled with the front of the housing, the camera section comprising—
  a camera unit operable to record an image and to be received within the slot,
  a motion sensor, integral with the camera section in proximity to the camera unit, operable to trigger the camera unit, and
  a camera section hinge coupled with the camera section and the housing to enable pivoting of the camera section relative to the housing such that the camera section is operable to be at least partially pivoted within the slot; and
a hinge including—
  a first section integral with at least a portion of the rear of the housing,
  a second section having an aperture to enable a mounting element to secure the second section to the tree and a cable lock to enable a cable to further secure the second section to the tree,
  a first pivotable joint coupled between the first section and the second section to enable pivoting of the housing after the second section is secured to the tree,
  a third section, and
  a second pivotable joint coupled between the second section and the third section such that the third section is operable to pivot over at least a portion of the aperture and the cable lock to prevent removal of the hinge from the tree.

23. The trail camera of claim 22, wherein the hinge includes a security device to secure the third section to the second section.

24. The trail camera of claim 22, wherein the camera unit is a digital camera unit.

25. The trail camera of claim 22, wherein the camera unit is operable to record still images and video.

26. The trail camera of claim 22, wherein the housing includes a power source to power the camera section and a recording medium to store recorded images.

27. The trail camera of claim 22, further including a flash.

28. The trail camera of claim 27, wherein the flash includes a light bulb.

29. The trail camera of claim 27, wherein the flash includes infrared LED elements to enable image capture in general darkness without illuminating a target location with visible light.

30. A trail camera for mounting to a tree, the trail camera including:
a housing including a slot positioned on the front side thereof and a plurality of protrusions that emulate the bark of the tree;
a camera section coupled with the housing, the camera section comprising—
  a camera unit operable to record an image and to be received within the slot, and
  a sensor, integral with the camera section, operable to trigger the camera unit; and
a first hinge coupled with the housing and the camera section, the first hinge being operable to pivot the camera section relative to the housing after the housing is secured to the fixed object, such that the camera section is operable to be at least partially pivoted in the slot; and
a second hinge including a first section integral with at least a portion of the housing, a second section operable to be secured to the tree, and a pivotable joint coupled between the first section and the second section to enable pivoting of the housing after the second hinge is secured to the tree.

* * * * *